United States Patent [19]

Nelson

[11] Patent Number: 4,523,092
[45] Date of Patent: Jun. 11, 1985

[54] FIBER OPTIC SENSORS FOR SIMULTANEOUSLY DETECTING DIFFERENT PARAMETERS IN A SINGLE SENSING TIP

[75] Inventor: Arthur R. Nelson, Stow, Mass.

[73] Assignee: Aetna Telecommunications Laboratories, Westboro, Mass.

[21] Appl. No.: 403,125

[22] Filed: Jul. 29, 1982

[51] Int. Cl.³ .............................................. G01D 5/26
[52] U.S. Cl. ..................... 250/227; 250/226
[58] Field of Search ................. 250/227, 226, 231 R, 250/231 P; 350/96.15; 356/32, 35.5; 73/800

[56] References Cited

U.S. PATENT DOCUMENTS

| | | |
|---|---|---|
| 2,824,235 | 2/1958 | Hahn, Jr. et al. . |
| 3,960,017 | 6/1976 | Romanowski . |
| 4,016,761 | 4/1977 | Rozzell et al. . |
| 4,136,566 | 1/1979 | Christensen . |
| 4,281,245 | 7/1981 | Brogardh et al. ................... 250/227 |
| 4,446,366 | 5/1984 | Brogardh et al. ................... 250/227 |
| 4,451,730 | 5/1984 | Brogardh et al. ................... 250/227 |

Primary Examiner—Edward P. Westin
Attorney, Agent, or Firm—Weingarten, Schurgin, Gagnebin & Hayes

[57] ABSTRACT

A fiber optic sensor for sensing pressure, temperature, voltage and other environmental parameters. A fiber is terminated in a series of semiconductor layers, each absorbing light as a function of the sensed parameters at a different wavelength. Light is transmitted down the fiber with plural frequencies and reflected by the termination to provide in the reflected light an attenuation representative of the parameters sensed. The reflected light intensity is detected and electronically processed to provide an indication of the magnitude of the parameters being sensed. With each frequency differently attenuated, the sensed parameters are separately detected. In one implementation two discrete frequencies or wavelengths of light are directed down the unitary fiber to its termination containing first and second semiconductor layers and reflective terminations that have an absorption characteristic which is a function of the sensed parameters such that the first frequency is partially absorbed in the first layer and reflected by its termination while the second frequency is transmitted substantially unaffected through to the second layer where it is partially absorbed and reflected. The two reflected wavelengths of radiation are retransmitted through the optical fiber and coupled into receivers which provide an output signal representing the reflected light magnitude. Parameter sensitive reflective layers may be substituted for the absorptive layers. The semiconductive layers may be employed in a detector configuration.

18 Claims, 13 Drawing Figures

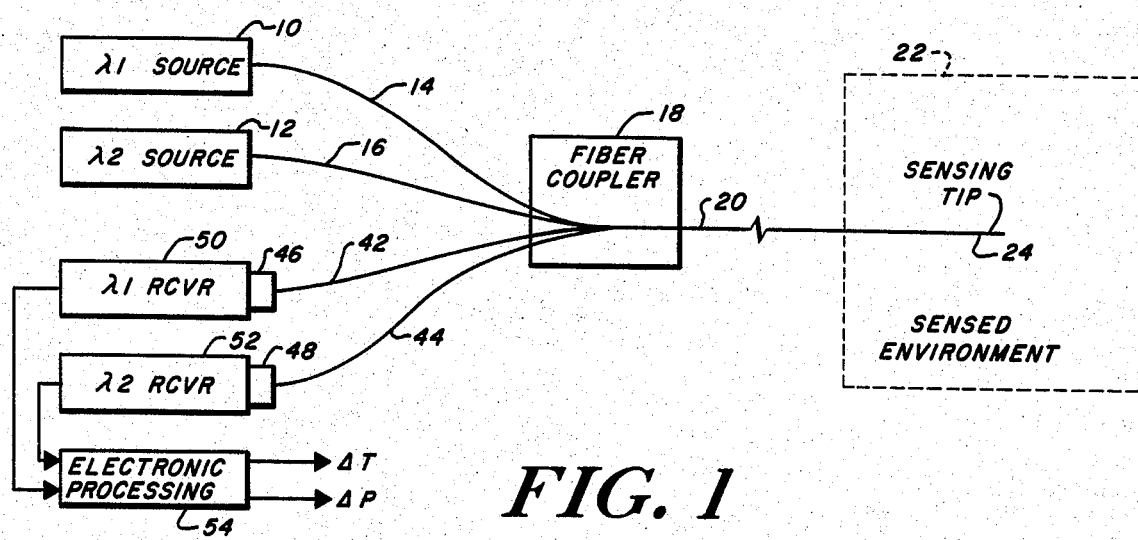
*FIG. 1*
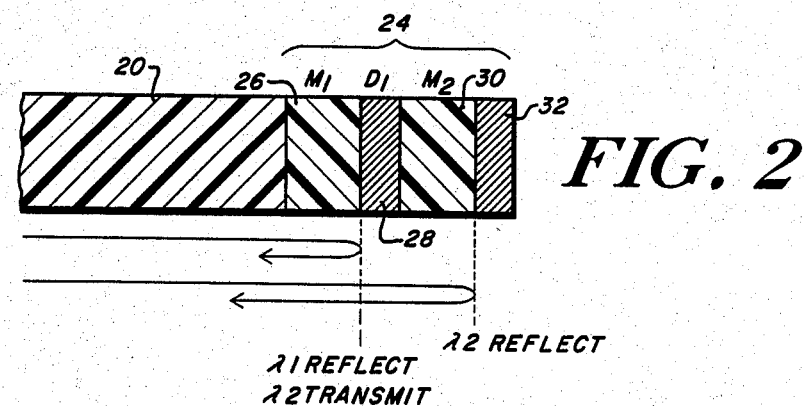
*FIG. 2*
*FIG. 3*
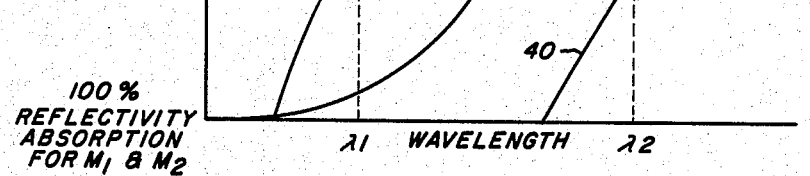
*FIG. 4A*
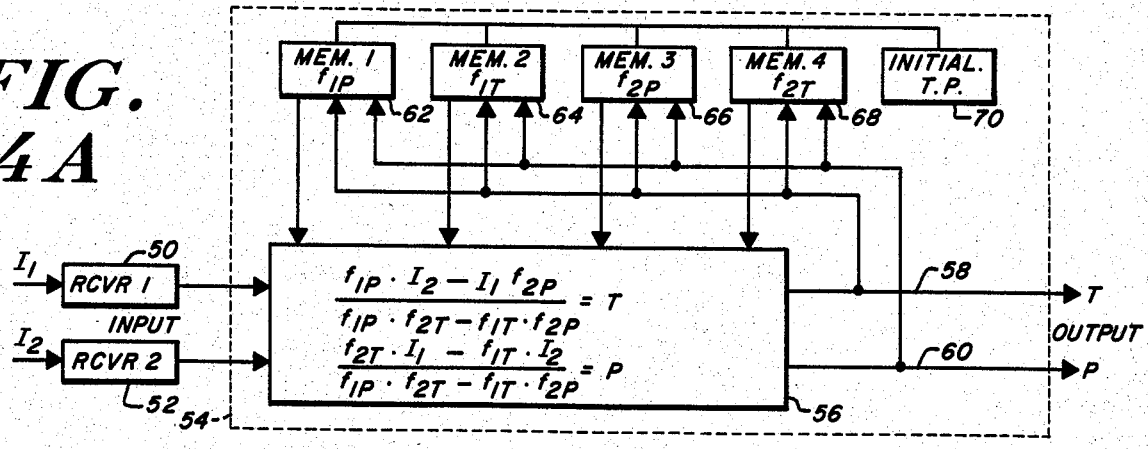

FIBER OPTIC SENSORS FOR SIMULTANEOUSLY DETECTING DIFFERENT PARAMETERS IN A SINGLE SENSING TIP

FIELD AND BACKGROUND OF THE INVENTION

There are many instances where the detection of parameters such as temperature, pressure, flow rate, voltage, etc., are required in remote or hostile environments. There are a number of materials whose light absorptive properties at certain frequencies, are sensitive to these parameters and application has been made of this property to provide a sensor of these parameters. In such circumstances, light is applied to the sensitive material, for example along an optical fiber, partially transmitted through the material, and returned through a receiver operative to sense a variation in the intensity of the light selectively transmitted through the sensitive material and to provide an output indication of the variations, correlated to the dimension of the parameter being sensed. An example of such an application is shown in U.S. Pat. No. 4,136,566.

The sensitivity of semiconductor materials to such parameters as pressure and temperature is sufficient to permit detection of pressure variations on the order of a thousandth of a pound per square inch. Applications for such sensors in areas of process control, deep ocean investigations, and among others are envisioned.

High optical sensitivities to temperature can also be achieved with semiconductor materials. Indeed, most semiconductor materials will be responsive to both temperature and pressure and in remote applications where both parameters may vary, as well as other parameters which may effect the absorption characteristic of semiconductor materials, the multiple dependency of the semiconductor material to these parameters can reduce the accuracy of the ultimately measured parameter. In addition, environmental effects on long lengths of optical fibers coupling light to and from selectively absorptive semiconductor material can also effect sensing accuracy.

SUMMARY OF THE INVENTION

The present invention utilizes plural frequencies of radiation applied to plural layers of semiconductor material each having a distinct sensitivity to environmental parameters and permitting separate detection of one parameter from another.

In accordance with the teaching of the present invention, a semiconductor sensor is provided for parameters including pressure temperature and voltage among others, in which a plurality of semiconductor layers are applied sequentially as terminations on a unitary optical fiber, each layer having a light absorption sensitive to the parameters being sensed. The layers each exhibit a transition between nearly full reflectivity (or absorption) to nearly full transmissivity over a small frequency range at different wavelengths. The actual location of the transition varies with the parameters being sensed. Multiple frequencies of radiation, encompassing the wavelengths at which these transitions occur in the semiconductor layers, are transmitted down the optical fiber toward the termination. In one embodiment, reflective layers are applied between the semiconductor layers and the layers are arranged such that the longest wavelengths are transmitted by all layers except the last which provides partial absorption. The long wavelengths are in turn reflected by a reflective layer on the very end. The shortest wavelengths are selectively absorbed by the first layer and reflected by a dielectic layer between it and subsequent semiconductor layers. Where intermediate wavelengths are employed, they will be transmitted through the first semiconductor layer and absorbed by corresponding ones of subsequent semiconductor layers, being reflected by a dielectric layer at its termination. There will result a reflected radiation of plural wavelengths, each one having one wavelength absorbed by a corresponding semiconductor layer to an extent corresponding to the sensitivity of that layer to environmental parameters. The returning radiation is separated according to wavelength and the magnitude or intensity at that wavelength detected to provide an output signal which is applied to electronic processing circuitry. Where the different semiconductor materials exhibit different relative sensitivities to the environmental parameters, the electronic processing circuitry provides separate detection of these parameters. In this manner, temperature and pressure effects in the environment are separately detected by a single sensor.

In another embodiment, partially reflective semiconductor layers are utilized. The variation in reflectivity of these layers in response to the sensed environmental parameters modulates the reflected radiation in a similar manner.

The invention may also be utilized as a sensor for flow rate by responding to corresponding pressure changes experienced by a small diameter multilayer optical fiber termination cemented to an interior wall of a conduit carrying the flowing medium.

In another embodiment, the semiconductor layers have electrical conductors applied to opposed edges thereof. A voltage magnitude is applied to the conductors and produces a corresponding effect on the absorption curve of the semiconductor materials. The voltage is sensed optically using the voltage effect on absorption or reflection as used with pressure and temperature.

In another embodiment, using a semiconductor and PN junction therein, the sensor can operate both as a sensor for an environmental parameter and as a detector for information incorporated in the applied radiation.

DESCRIPTION OF THE DRAWINGS

These and other features of the present invention are more fully set forth below in the solely exemplary detailed description and accompanying drawing of which:

FIG. 1 is a schematic diagram of a system for sensing multiple parameters in an environment using multiple frequency absorption techniques;

FIG. 2 is a cross-sectional view of a parameter sensitive optical fiber termination as used in the system of FIG. 1;

FIG. 3 is an absorption diagram useful in explaining the operation of the present invention;

FIGS. 4A and 4B are diagrams of circuitry used in processing multiple frequency radiation reflected by the sensor of FIG 2;

DETAILED DESCRIPTION OF THE INVENTION

Figure 4B:
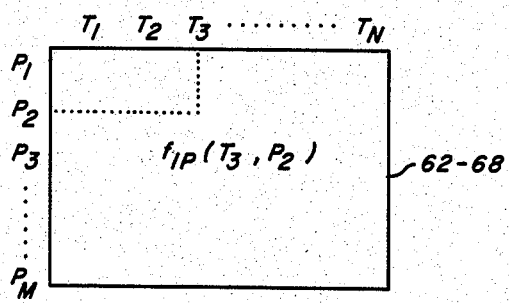

The present invention contemplates a unitary sensor for plural parameters, typically in a remote or hostile environment, in which the effect of two or more variables at work in the environment are sensed and separately identified. In particular, the sensor comprises plural layers of semiconductor material each having a distinct absorption characteristic, sensitive to the environmental parameters, and in which radiation is applied through the layers to permit the relative absorption of each to be separately detected and processed to distinguish the individual parameters.

In particular, the sensing system of the present invention may be used to sense body temperature and pressure in a remote environment, each parameter having an effect upon the light absorption of semiconductor material. Such a system is illustrated schematically in FIG. 1 in which first and second light sources, 10 and 12, each have different output frequencies identified as first and second wavelengths. The sources 10 and 12 are typically laser sources and may therefore provide monochromatic output radiation, but broadbanded radiation such as from a light emitting diode may also be utilized.

In the embodiment of FIG. 1, first and second fiber optic cables 14 and 16 transmit the radiation produced by the respective sources 10 and 12 to a fiber coupler 18 where the radiation is combined into a single beam on a unitary fiber 20. The unitary fiber 20 may extend a distance into a sensed environment 22 which may be any location where temperature and pressure, or other parameters, are to be measured. Examples of such environments include the interior of processing machinery in industrial processes or deep ocean regions and other high pressure environments.

The optical fiber 20 has a termination 24 comprising a sensing tip which is more fully illustrated in FIG. 2. As is shown there, the termination 24 has a first semiconductor layer 26. This, and other layers to be described, are typically a very thin layer formed by sputtering on to the end of the fiber 20 a layer of semiconductor material to a thickness which need only be one to ten microns thick in the case of most useful semiconductor materials. On top of the layer 26 a dichroic layer 28 is produced to act as a reflector for some of the wavelengths in the applied radiation. On top of layer 28, a second semiconductor layer 30, of distinct absorption characteristics, is applied of a similar thickness to layer 26. The thickness of these layers 26 and 30 is essentially governed by the desire for significant but not complete absorption (or reflection) of radiation applied through them. The sensing tip 24 ends with a layer 32 which is reflective for all radiation passing through the layer 30.

Considering the radiation in the fiber 20 as composed of first and second distinct wavelengths provided by the sources 10 and 12 identified in FIG. 1, the first layer 26 is provided with an absorption profile as typically illustrated by curve 34 of FIG. 3. As shown by curve 34, the radiation at the wavelength of source 10 is partially absorbed as indicated by the absorption effect at point 36 corresponding to radiation of that wavelength. The semiconductor material of layer 26 is typically sensitive to temperature and pressure effects in the position of curve 34 such that the curve 34 will shift to a curve 34' under the effects of a change in temperature or pressure, or both.

The dielectric layer 28 will have a transmission/reflection profile illustrated by curve 38 in FIG. 3 such that it will be substantially reflective to radiation at the first wavelength from source 10. Light of that frequency in fiber 20 will be reflected by layer 28 back through the layer 26 with further absorption before being returned by the fiber 20 to coupler 18.

The semiconductor layer 30 has an absorption profile illustrated by curve 40 in FIG. 3 which, under the effects of temperature and pressure variations, can shift as illustrated by displaced curve 40'. The semiconductor material of layer 30 has an absorption characteristic as specified by curve 40 at the second wavelength corresponding to the radiation produced by source 12 in FIG. 1. As can be seen from FIG. 3, the radiation of this second wavelength will be substantially unaffected by the layers 26 and 28 since the corresponding transmission profiles for those materials provides substantially full transmission at the second wavelength. The radiation at this second wavelength will then be reflected by reflective layer 32 and returned back through partially absorptive layer 30 as well as transmissive layers 26 and 28 for transmission by the fiber 20 to coupler 18.

The reflected wave returning along fiber 20 to coupler 18 will include the same two frequency components provided by respective sources 10 and 12, each attenuated by amounts depending upon the absorption characteristic of the layers 26 and 30 and in particular their sensitivity to temperature and pressure effects. The coupler 18 separates the reflected radiation onto first and second separate fibers 42 and 44 which are applied through respective wavelength filters 46 and 48 to separate receivers 50 and 52. The filters 46 and 48 effectively limit the radiation transmitted by each fiber 42 and 44 respectively to the first and second wavelengths in the radiation on fiber 20. The individual receivers 50 and 52 then provide output signals corresponding to the magnitude or intensity of radiation reflected back along fiber 20 at the respective first and second wavelengths. These output signals are provided to an electronic processing circuit 54 wherein the temperature and pressure variations sensed at the tip 24 are provided as separate outputs.

Electronic circuitry providing this processing is illustrated in FIGS. 4A and 4B. In the embodiment illustrated, the receivers 50 and 52 include analog to digital conversion circuitry so that their outputs to the processing circuit 54 are in digital form and applied therein to a processor 56 which performs the calculations:

$$T = \frac{f_{1P} \times I_2 - I_1 \times f_{2P}}{f_{1P} \times f_{2T} - f_{1T} \times f_{2P}}$$

and $$P = \frac{f_{2T} \times I_1 - f_{1T} \times I_2}{f_{1P} \times f_{2T} - f_{1T} \times f_{2P}}$$

where f is frequency and I is intensity.

The processor 56 provides two outputs on respective lines 58 and 60, typically in digital form, identifying the temperature and pressure values. These outputs are also applied to matrix memories 62, 64, 66 and 68. Which respectively provide the values $f_{1P}$, $f_{1T}$, $f_{2P}$, $f_{2T}$ to the processor 56 in accordance with the input values of T and P. Initial input values of T and P are typically provided from a selector switch 70.

A typical one of the memories 62-68 is illustrated in FIG. B. Each memory is addressable by the T and P values in respective columns and rows. The corresponding f value is located at the address designated by the particular temperature and pressure value. That digital value is then applied from the corresponding memories 62-68 to the processor 56 to perform the functions there indicated. The tables of f as a function of T and P are determined experimentally for the sensor material employed.

In typical implementation the processor 56 will be operated as an interative loop in which, for each value of temperature and pressure utilized to provide the corresponding f value from the memories 62-68, a new temperature and pressure value will be generated and in turn used to determine new f values. The interation continues until the loop stabilizes to within a predetermined error value in accordance with well known interative loop operation.

The semiconductor materials used for the termination or sensing tip 24 of the optical fiber 20 are selected on the basis of their bandgap energy, the energy between the conduction and valance bands of the material. At radiation wavelengths for which the corresponding photon energy approximates the bandgap energy, the characteristics of curves 36 or 40 in FIG. 3 will be exhibited. Different semiconductor materials have, or can be combined to have, different wavelengths at which the transition between transmissivity and absorptivity typified by curves 36 and 40, takes place. The steepness of the transition can also be tailored.

Materials from which semiconductor layers can be fabricated include direct bandgap materials such as most II-VI or III-V semiconductors. In addition, indirect bandgap materials such as silicon and germanium can be used along with some noncrystalline semiconductors for which a bandgap absorption phenomenon of the type illustrated in FIG. 3 is present.

Figure 5A:
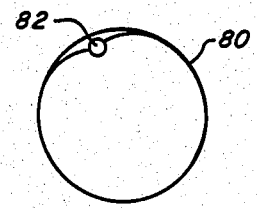
FIG. 5A is a cross-sectional view of a sensor according to the present invention in an application for measuring flow rate.

The sensor of the present invention may also be utilized for detecting flow rates using a structure illustrated in FIG. 5A. As shown there a conduit 80 containing a flowing medium, the flow rate of which is to be detected, has a sensing tip 82 adhered to an interior wall. Tip 82 may be of a construction illustrated above. Flow rate is detected using the processing circuitry to detect pressure, and the known relationship between flow rate and pressure.

Figure 5B:
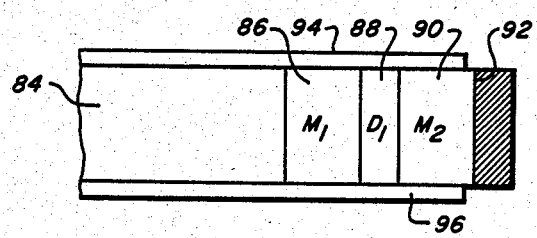
FIG. 5B is a cross-sectional view of a sensor according to the present invention in an application for measuring voltage level.

FIG. 5B illustrates a sensor tip in which voltage is sensed using the Franz-Keldysh effect on the semiconductor layers. As shown in FIG. 5, a unitary fiber optic cable 84 applies radiation to and receives reflected radiation from a termination having a semiconductor layer 86, dielectric layer 88, semiconductor layer 90, and end reflective layer 92, all as described above. Conductive layers or electrodes 94 and 96 are applied at opposite edges of the terminating tip portion of the fiber 84 in contact with the layers 86 and 90. The voltage to be sensed is applied to the semiconductors by electrodes 94 and 96. The effect of the voltage upon light absorption by the layers 86 and 90 produces a corresponding change in the reflected radiation magnitude as noted above for temperature and pressure. The voltage is then detected as shown above for these other parameters.

Figure 6:
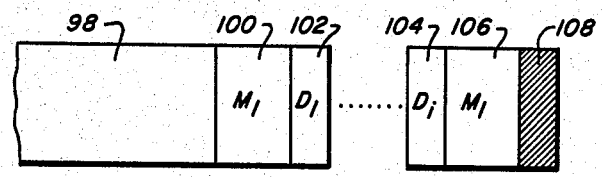
FIG. 6 is a cross-section of a sensor according to the present invention having an arbitrary number of semiconductor layers of differing frequency absorption characteristics.

More than two semiconductor layers can be utilized as illustrated in FIG. 6 in which a fiber 98 is terminated with a generalized number of layers represented by an initial semiconductor layer 100 and subsequent dielectric layer 102 and final dielectric layer 104 and semiconductor layer 106. A final reflective layer 108 is applied on the very end. A number of intermediate semiconductor and dielectric layers may be applied as desirable for the parameters being sensed.

Figure 7:
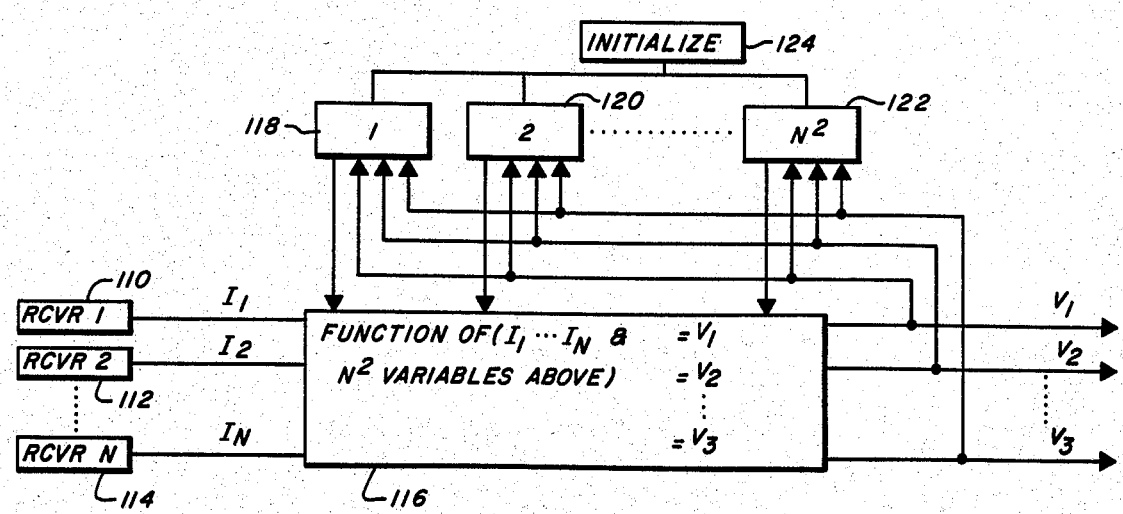
FIG. 7 is an electronic circuit diagram of processing electronics for an arbitrary number of frequencies and corresponding sensor semiconductor layers as shown in FIG. 6.

FIG. 7 represents a generalized electronic processing circuit for processing radiation having more then two wavelengths and producing output signals corresponding to the magnitude of each parameter sensed.

The circuitry shown in FIG. 7 includes a plurality of receivers 110, 112 . . . 114 each including an analog to digital converter to provide a corresponding digital intensity output to a processor 116, operative in the manner of the processor 56 of FIG. 4A. In this manner outputs of the values (Vi) of several parameters such as temperature, pressure, voltage, etc., are provided for each of the plural receiver inputs. Memories 118, 120 . . . 122 are provided to respond to these values, along with initial values provided by a selector switch system 124. Operating in the manner described with respect to FIG. 4A, plural outputs are provided.

Figure 8:
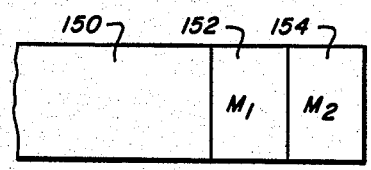
FIG. 8 is a diagrammatic view of a sensor according to the present invention using parameter sensitive reflectivity of multiple semiconductor layers.

A semiconductor sensor utilizing variations in the reflective properties of semiconductor layers, as opposed to the absorptive properties, is illustrated in FIG. 8. As shown there, an optical fiber 150 is terminated with first and second semiconductor layers 152 and 154. By tailoring the layers 152 and 154 to provide significant reflection, as a function of the parameters being sensed, the reflected radiation is modulated in a manner similar to that illustrated above. In particular, the layer 152 will typically be transmissive to the radiation at a second wavelength but partially reflective of radiation at the first wavelength of multiwavelength light transmitted down the fiber 150. The degree of reflection is a function of the parameter being sensed. The layer 154 will in turn be partially reflective, to a degree corresponding to the parameters being sensed, to the radiation at the second wavelength. The reflected radiation is then detected and electrically processed as shown in FIG. 1.

Figure 9:
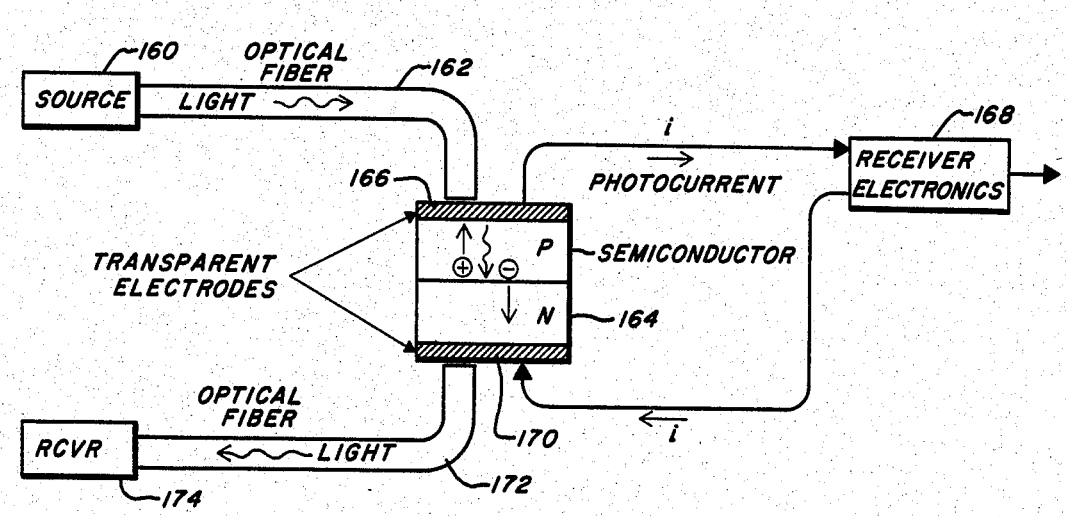
FIG. 9 is a diagram of a combined semiconductor sensor and detector according to the present invention.

With respect to FIG. 9, a system is illustrated for combining functions of sensor and detector into a single temperature and pressure dependent photosensor. As illustrated in FIG. 9, a source 160 provides light into an optical fiber 162. The light is typically data modulated as known in the art and applied to a semiconductor element 164 having a PN junction through a transparent electrode 166. Photons in the applied radiation, generate hole-electron pairs by interaction with the material of the semiconductor element 164. The hole-electron pairs migrate respectively towards the P and N type semiconductor portions of the element 164 inducing a current to flow from the electrode 166 through receiver electronics 168 to a transparent electrode 170 on the opposite surface of the semiconductor element 164. In this manner data in the light within the optical fiber 162 is converted to electrical signals which can be demodulated by the electronics 168 in conventional fashion. At the same time, light traverses the semiconductor element 164, passing through the transparent electrode 170 into a further optical fiber 172 for application to a receiver 174 wherein the light intensity may be used to determine the temperature and pressure effects within the environment of the semiconductor element 164.

Instead of a data modulated light beam, the source 160 may provide a dc light level in which the system of FIG. 9 operates solely as a sensor, as described above, and not as a combined sensor and detector.

Figure 10:
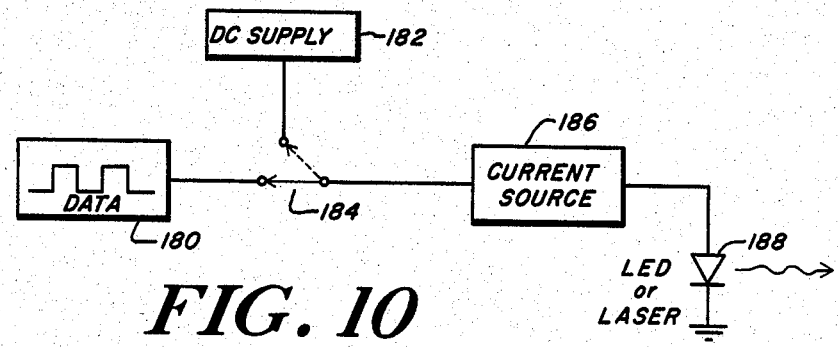
FIG. 10 is a circuit diagram of drive electronics for use in the system of FIG. 9.

FIG. 10 illustrates typical circuitry for implementing the source 160. As shown there a data source 180, or dc level from a supply 182 is selectively connected by a switch 184 to a current source 186 which provides an output, either as a constant current level or a data modulated current level, to a light emitting diode source 188. In lieu of a light emitting diode a modulated laser may be substituted instead. The light from the diode, or laser, 188 is then applied to the optical fiber 162.

Figure 11:
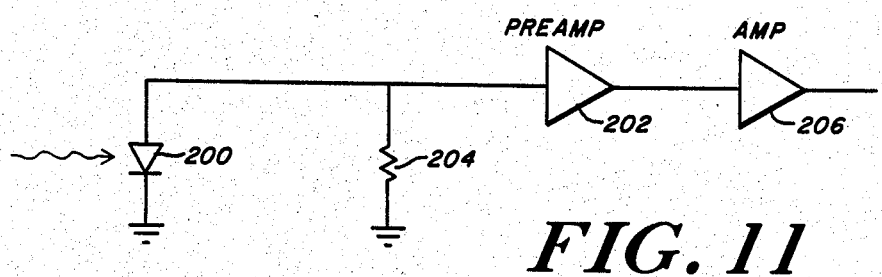
FIG. 11 is a circuit diagram of receiver electronics for use in the system of FIG. 9.

FIG. 11 illustrates typical receiver circuitry comprising a light sensitive diode 200, the output of which is applied to the input of a preamplifier 202, across a resistor 204. The output of the preamplifier 202 is typically applied to an amplifier 206 for further amplification before an output signal, representing the typical intensity level, may typically be applied to analog to digital conversion circuitry. The circuitry to FIGS. 10 and 11 may be used throughout the system of the present invention for implementing source or receiver elements as appropriate.

The above description is intended solely as exemplary of structure, and its operation, according to the invention. The actual scope of the invention is to be determined solely from the following claims.

What is claimed is:

1. A sensor system for simultaneously sensing at least two different parameters and utilizing selective absorption of a plurality of frequencies by different optical layers comprising:
   an optical fiber;
   means for applying radiation of a plurality of optical frequencies to said fiber;
   said optical fiber having a termination operative to reflect said radiation of plural frequencies back through said optical fiber;
   said termination including at least two contiguous and sequential semiconductor layers each having an optical absorption curve at a distinct wavelength wherein the absorption is a function of a parameter being sensed; and
   means responsive to reflected radiation in said fiber for analyzing the reflected radiation at said plurality of frequencies to provide an indication of the value of the respective parameters.

2. The system of claim 1, wherein said applying means includes:
   means for applying at least two distinct frequencies of radiation to said fiber and further including contiguous reflecting means between the semiconductor layers and at the far end of the last semiconductor layer, said reflecting means respectively reflecting light of increasing wavelength in the direction of the far end of said termination.

3. The system of claim 2, wherein said applying means includes:
   means for applying at least two frequencies of radiation to two separate fibers; and
   means for coupling said two separate fibers into a unitary fiber.

4. The system of claim 1, wherein said applying means includes a broadband source of radiation.

5. The system of claim 1, wherein said fiber is a single fiber optic fiber having both said applied radiation and reflected radiation travelling therethrough in opposite directions.

6. The sensor of claim 1, wherein said fiber termination includes:
   first and second frequency dependent absorbing materials separated by a third frequency dependent absorbing, reflecting medium and terminated by a 100% reflective reflecting layer;
   said first layer being absorptive to radiation at said first frequency as a function of said parameter and substantially transmissive to others of said plural frequencies;
   said second layer being partially absorptive to the second of said plural frequencies as a function of said sensed parameter;
   said third material being substantially reflective to radiation of the first of said plural frequencies and transmissive to radiation of the second of said plural frequencies whereby radiation of the first of said plural frequencies is reflected back through said fiber with an absorption characteristic substantially dependent upon said first layer and the second of said plural frequencies is reflected back through said fiber by said reflecting layer with an absorption characteristic substantially specified by said second layer.

7. The sensor of claim 1, wherein said termination includes:
   a first layer reflective at a first frequency of said plural frequencies to a degree representative of the parameter being sensed in said environment and substantially transmissive to others of said plural frequencies;
   a second layer located beyond said first layer and reflective to a second frequency of said plural frequencies to a degree representative of the value of the parameter sensed in said environment.

8. The system of claim 6, wherein:
   said first and second layers are semiconductor materials selected from the group consisting of direct bandgap semiconductors from group II-VI or III-V, indirect bandgap materials including silicon and germanium, and noncrystalline semiconductors; and
   said third layer is a dichroic layer.

9. The sensor system of claim 7, wherein said first and second layers include semiconductor materials selected from the group consisting of direct bandgap materials from group II-VI or III-V semiconductors, indirect bandgap materials including silicon and germanium, and noncrystalline semiconductors.

10. The system of claim 6, wherein said third layer is substantially transmissive at other frequencies than said first frequency.

11. The sensor of claim 1, wherein said means for providing an indication of said parameter includes means for detecting the level of reflected radiation at the first and second frequencies of said plural frequencies.

12. The system of claim 1 or 11, wherein said parameter includes temperature.

13. The system of claims 1 or 11 wherein said parameter includes pressure.

14. The system of claims 1 or 11 wherein:
said parameter includes at least two parameters; and
means are provided for separately indicating said two parameters in response to the amplitudes of the first and second frequencies of reflected radiation.

15. The system of claim 14 wherein said parameters are temperature and pressure.

16. The system of claim 1, wherein said means for indicating said parameter includes means for indicating flow velocity and said fiber termination is adapted for sensing the rate of flow of a flowing medium.

17. The system of claim 16, wherein said termination is adhered to an inner wall of a conduit containing said flowing medium.

18. The system of claims 1, 2, 4, 6, 7, 8, 9, 10, 15 or 16, wherein said fiber is a unitary fiber.

* * * * *